Figure 1:
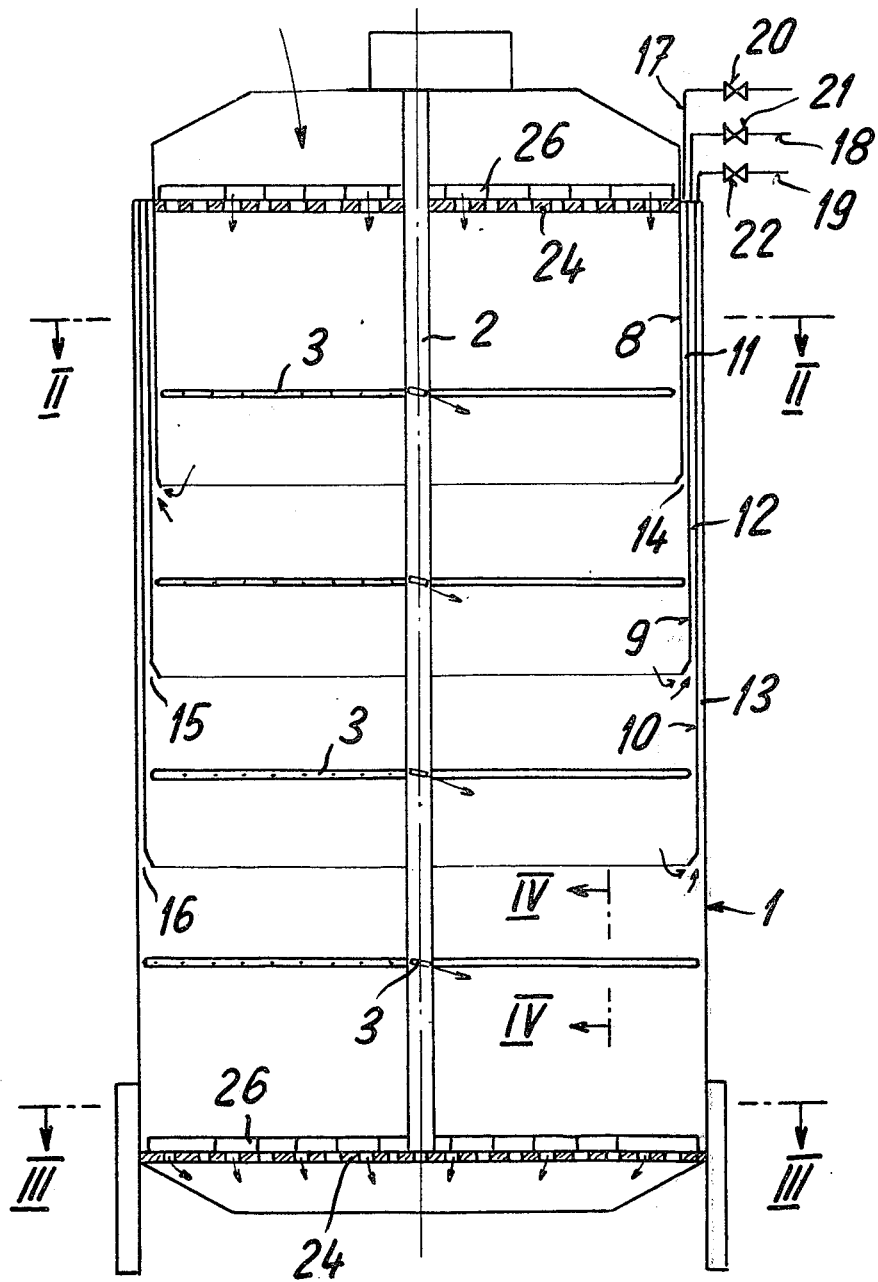

United States Patent [19]
Kaelin

[11] 3,960,537

[45] June 1, 1976

[54] METHOD OF PROCESSING REFUSE AND/OR SLUDGE AND A PLANT FOR CARRYING OUT THE METHOD

[76] Inventor: Joseph Richard Kaelin, Villa Seeburg, CH-6374 Buochs, Switzerland

[22] Filed: Nov. 22, 1974

[21] Appl. No.: 526,227

[52] U.S. Cl. .................................... 71/9; 23/259.1; 34/174; 71/14
[51] Int. Cl.² .................. C05F 11/08; F26B 17/12; C05F 9/04; C05F 3/06
[58] Field of Search .................. 71/1, 8, 9, 11, 14, 71/15, 21, 22; 23/259.1; 34/30, 31, 166, 168, 174, 175, 181, 182, 185

[56] References Cited
UNITED STATES PATENTS

| | | | |
|---|---|---|---|
| 1,251,573 | 1/1918 | Provost | 34/174 X |
| 2,474,833 | 7/1949 | Eweson | 34/168 X |
| 3,270,437 | 9/1966 | Lara et al. | 34/168 |
| 3,357,812 | 12/1967 | Snell | 71/14 X |
| 3,756,784 | 9/1973 | Pittwood | 71/8 X |

*Primary Examiner*—Frank A. Spear, Jr.
*Assistant Examiner*—Ferris H. Lander
*Attorney, Agent, or Firm*—Eric P. Schellin

[57] ABSTRACT

A method and apparatus for biologically treating refuse or thickened sludge to form compost utilizes a vertical cylindrical chamber havng an upper inlet aperture and a lower outlet aperture. An axial shaft located within the chamber has mounted thereon a plurality of radial arms each having a plurality of gas distributor blades. Sets of arms are spaced axially along the shaft. The chamber wall is formed in part by a plurality of hollow, cylindrical exhaust ducts concentrically arranged and extending differing distances along the chamber side. The end of each duct is flared to form an exhaust aperture which extends around the entire chamber. Material to be treated enters the chamber at the upper inlet and fills the chamber. The rotating radial arms and blades distribute a treating gas mixture to the material, which gas is exhausted by the annular exhaust apertures and exhaust ducts. The treating gas, heated by the process, is used to heat a portion of material which has been treated, and this portion is recirculated to be admixed with incoming material to be treated.

9 Claims, 5 Drawing Figures

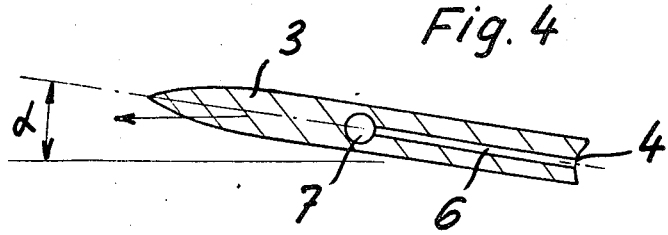
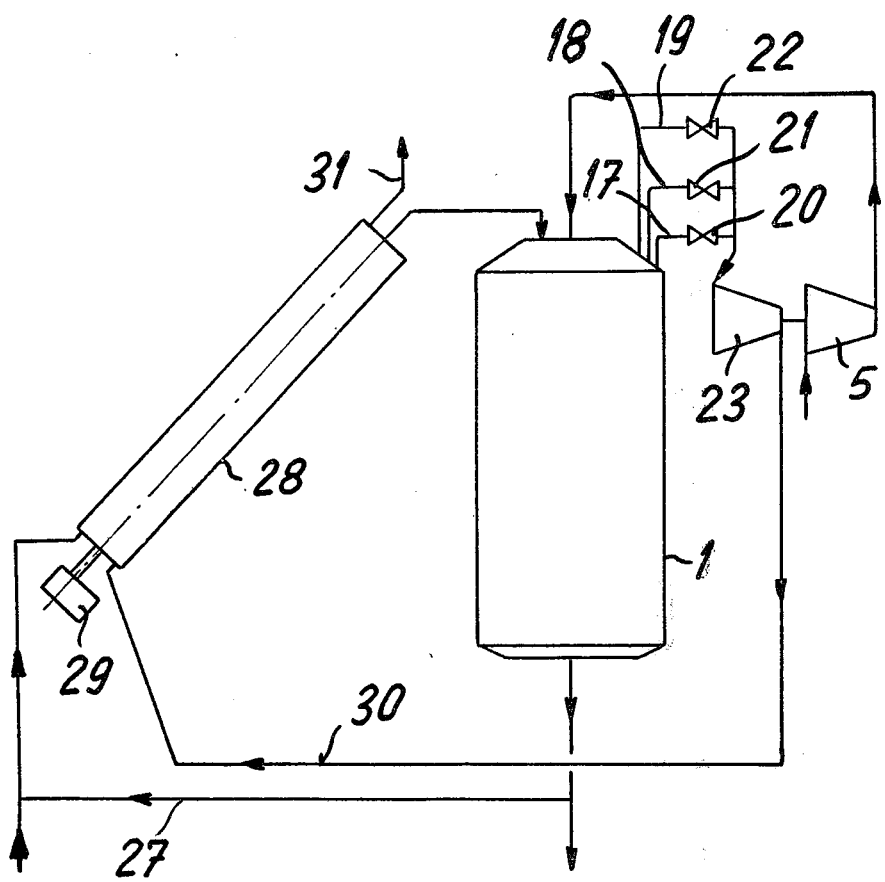

METHOD OF PROCESSING REFUSE AND/OR SLUDGE AND A PLANT FOR CARRYING OUT THE METHOD

The present patent relates to a method of processing refuse and/or thickened sludge to form compost, wherein the material to be treated is filled from above into a treatment chamber, whereupon the material to be treated is continuously mixed with a gas or gas mixture assisting the biological conversion process, and the treated material is then discharged at the bottom of the treatment chamber, so that the material being treated is automatically passed in coherent form and in the vertical direction from top to bottom through the treatment chamber.

Methods previously known for the processing of refuse and/or sludge to form compost have the disadvantage that the aeration of the material being treated, in respect of its total volume, is effected very irregularly so that the residence time in the treatment chamber of the material being treated is lengthened, and that the necessary blower drive powers for effecting the aeration are very high.

A bacteriological autoclave is already known whose interior is divided into a plurality of superimposed treatment chambers, in each of which is disposed a rotating arm which sweeps over the bottom of the chamber and serves to introduce air into the material being treated and at the same time to discharge the material from the respective treatment chamber. The air introduced into the lowermost chamber by means of a blower passes from that chamber into the distributor arm of the next higher chamber. In this way the oxygen concentration in the gas introduced into the individual chambers decreases progressively in the upward direction, which is very undesirable, because it is precisely in the uppermost chambers that the biological process should be carried out as quickly and completely as possible. Individual feeding of the various chambers with the amount of air required in each particular case is not possible. The air introduced flows however in the axial direction through the material which is to be aerated, and which is contained in the various chambers, only over a very short path which corresponds to the height of the material contained in the respective chamber. Since the material being treated is pushed in front of the arms, it is only poorly aerated.

An apparatus for composting waste material is also already known, in which the material to be treated is likewise treated in a plurality of superimposed chambers, each chamber having its own air inlet and outlet. Since the air is likewise drawn into the individual chambers from the free space existing above the material contained in the chambers, here again the material is aerated only over a very short path extending vertically and parallel to the axis of the chamber, which results in very poor utilisation of the oxygen contained in the air. Moreover, the material requiring aeration is aerated only irregularly.

Furthermore, a composting tower is also known which is provided with perforated stirring arms and in which compressed air is fed by means of a compressor to the perforated stirring arms and thus delivered to the interior of the tower. How the air delivered to the interior of the tower will flow through the refuse contained in the interior of the tower is not determinate, because the air flows on the path of minimum resistance to flow, which is completely indeterminate.

The object of the invention is to provide a method and a plant which do not have these disadvantages, that is to say in which all the material to be treated is forced to pass in succession and without interruption through various aeration zones extending in the radial direction, so that all the material to be treated passes continuously and without interruption through the biological conversion process over the entire height of the individual chamber.

The method of the invention is characterised in that the gas or gas mixture is delivered, under elevated pressure, into the material being treated by means of a plurality of gas distributor blades spaced apart from one another in the axial direction in the treatment chamber and mounted for rotation about an axis extending parallel to the direction in which the material passes through, and that each gas distributor blade is provided with at least one suction outlet for the gas current, this suction outlet or outlets being situated in the side wall of the treatment chamber, above and/or below the distributor blades, and covered by the material being treated, so that currents of gas or gas mixture flowing radially outwards are formed by the gas distributor blades in the material being treated.

Before being completely permeated with the current of gas or gas mixture supporting the biological conversion process in the treatment chamber, it is expedient for the refuse and/or sludge which is to be treated to be inoculated with the biology effecting the biological conversion process, by admixing previously treated material, for which purpose from 5 to 20%, preferably from 10 to 15% of previously treated material is mixed with the refuse and/or sludge which is to undergo processing.

For the purpose of loosening the thickened sludge it is advantageous for dry organic substances to be mixed with it before it is introduced into the treatment chamber.

Furthermore, it is expedient for the outgoing air to be drawn off through at least two hollow cylindrical exhaust ducts which are disposed concentrically to one another, form a part of the side wall of the treatment chamber, and extend from the inlet aperture of the treatment chamber towards the outlet aperture of the latter, each of which exhaust ducts forms a circular annular exhaust aperture which is directed towards the outlet aperture and leads into the interior of the treatment chamber, these exhaust apertures being spaced apart from one another in the axial direction.

A further object of the invention is an installation for carrying out the method of the invention, which installation is characterised in that it comprises a treatment chamber for receiving the material to be treated, a plurality of superimposed gas distributor blades mounted in the treatment chamber for rotation about an axis extending parallel to the direction in which the material passes through, the blades having gas outlet apertures which are disposed at the rear edges and connected to a pressure blower, the installation further comprising a suction blower connected to the exhaust points disposed over the range of rotation of the gas distributor blades, in the side wall of the treatment chamber, for the forced passage through the material being treated of a plurality of currents of gas or gas mixture flowing radially outwards from the gas distributor blades, and that the side wall of the treatment chamber consists of at least two tubes disposed one in the other, that neighbouring tubes are spaced slightly apart from one another to form an exhaust duct, that the inner of two neighbouring tubes extends a shorter distance towards the discharge end of the treatment chamber than the outer tube, and that the exhaust duct or ducts is or are connected to a suction blower.

Figure 2:
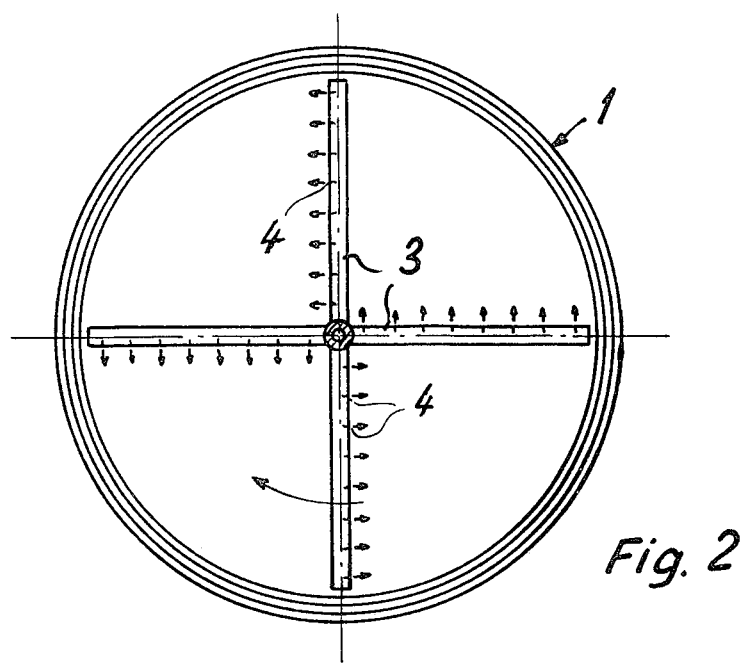
Figure 3:
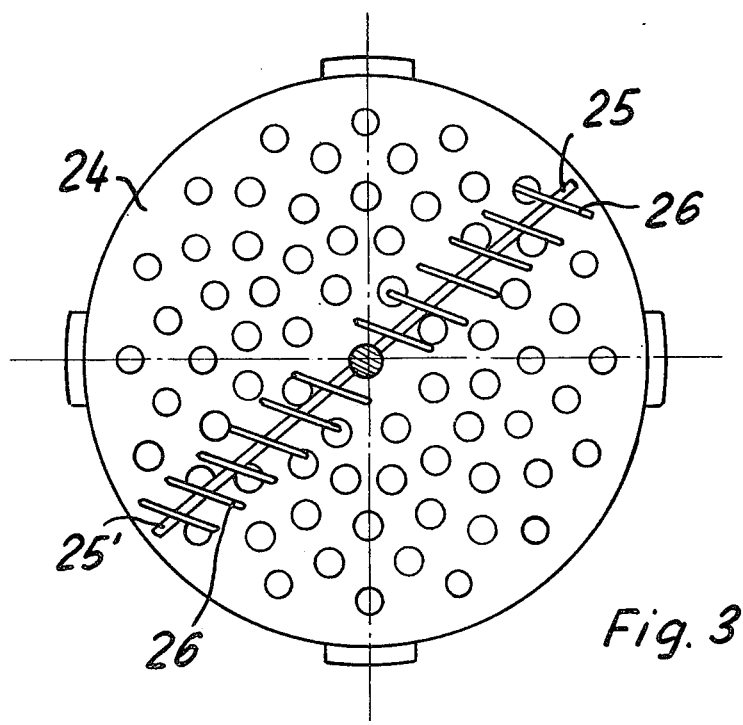

In order to assist the advance of the materials being treated towards the outlet aperture, it is advantageous for the angle of incidence of the gas distributor blades to be positive The invention is explained below by way of example and with reference to the drawing, in which:

FIG. 1 is a section through a form of construction of an installation according to the invention, which is given as an example, FIG. 2 a section on the line II—II in FIG. 1, FIG. 3 a section on the line III—III in FIG. 1, FIG. 4 is a section on the line IV—IV, on a larger scale, and FIG. 5 is a diagram of the entire installation.

As can be seen in FIGS. 1 to 5, the installation shown comprises a treatment chamber 1 for receiving the material to be treated, and also a plurality of gas distributor blades 3 disposed crosswise at points spaced apart from one another on a rotatable gas distributor blade shaft 2 extending parallel to the direction in which the material passes through.

As can be seen particularly in FIG. 4, the gas distributor blades 3 are provided on their rear edges with gas outlet apertures 4, which for the purpose of introducing oxygen-containing gas, such as for example air, air enriched with pure oxygen, or pure oxygen, are connected via the ducts 6 and 7 in the blades 3 and the hollow shaft 2 to a pressure blower 5.

The side wall of the treatment chamber 1 consists of three tubes 8, 9, and 10 disposed one inside the other, each two neighbouring tubes being slightly spaced apart in order to form an exhaust duct 11, 12, and 13 respectively, and the inner of each two neighbouring tubes extending a shorter distance towards the discharge end of the treatment chamber than the outer tube, so that three circular annular exhaust apertures 14, 15, and 16 respectively disposed concentrically and leading into the interior of the treatment chamber are formed.

In order to prevent the material contained in the treatment chamber 1 from passing into the interior of the exhaust ducts 11, 12, or 13, the ends of the tubes 8, 9, and 10 situated in the interior of the treatment chamber 1 are bent over towards the centre axis of the treatment chamber, so that in the region of the exhaust apertures 14, 15, and 16 there are formed respective stripper edges intended for the material being treated. In order to be able to permeate the top and bottom regions of the material contained in the treatment chamber 1 with a smaller amount of gas or gas mixture then the middle region, in which the greatest biological activity takes place, the exhaust ducts 11, 12, and 13 are connected to a suction blower 23 by way of exhaust pipes 17, 18, and 19 respectively, with the interposition of flow regulating means 20, 21, and 22 respectively. The four groups of gas distributor blades 3 situated at different heights in the treatment chamber 1 may obviously also be connected to the pressure blower 5 by way of respective regulating means.

For the uniform distribution of the material to be treated, which is introduced into the treatment chamber 1, the inlet aperture is covered by a perforated plate 24 and directly above the perforated plate are disposed two distributor arms 25 and 25' (see FIG. 3) which cooperate with the perforated plate and are mounted on the same shaft 2 as the gas distributor blades 3, and on which distributor elements 26 are fastened which, viewed in the peripheral direction, overlap one another and are spaced apart from one another in the radial direction.

For the uniform discharge of the material treated in the treatment chamber the discharge aperture is covered by a perforated plate 24 similarly to the inlet aperture, and directly above the perforated plate are likewise disposed two distributor arms 25 and 25' which cooperate with the perforated plate and are mounted on the shaft 2, and on which the distributor elements 26 are fastened.

In order to keep the residence time of the material treated in the treatment chamber 1 as short as possible, the refuse and/or thickened sludge which is to be treated is inoculated with the biology bringing about the biological conversion process by admixing previously treated material before the refuse and/or thickened sludge is introduced into the treatment chamber 1. As can be seen in the diagram shown in FIG. 5, this is achieved by mixing with the refuse and/or sludge which is to be treated from 5 to 20%, preferably from 10 to 15% of previously treated material introduced through a delivery device 27. The intensive mixing is expediently effected in the screw conveyor 28, which is driven by means of a motor 29.

In order to keep the residence time of the material to be treated in the treatment chamber 1 as short as possible, it is in addition advantageous for the gas mixture drawn off through the exhaust ducts 11, 12 and 13 and heated by the biological conversion process taking place in the treatment chamber 1 to be passed through the connecting pipe 30 into the interior of the screw conveyor 28, and for the material contained in the latter to be thus heated by from 4° to 10°C. The cooled gas mixture is discharged from the interior of the screw conveyor 28 by way of the pipe 31.

Since the exhaust ducts 11, 12, and 13 form at the same time the outer wall of the treatment chamber 1 and since heated gases flow through them, they also contribute towards the heating of the material to be treated which is contained in the chamber 1.

If only thickened sludge is to be treated in the treatment chamber 1, it is expedient for organic dry material, such as for example peat dust, to be mixed with the thickened sludge in order to loosen it.

The gas distributor blades 3 may obviously also be fastened on the shaft 2 after the style of a spiral staircase.

In order to be certain that the material contained in the treatment chamber 1 is moved downwards towards the discharge aperture, as shown in FIG. 4 the gas distributor blades 3 have a positive angle of incidence α.

I claim:

1. A biological conversion process for processing refuse or thickened sludge to form compost in a single continuous treatment chamber comprising the steps of:

filling the material to be treated from above into the top of said treatment chamber, continuously permeating the material to be treated with a gas mixture to assist the biological conversion, delivering the permeating gas mixture under elevated pressure into the material to be treated by means of a plurality of gas distributor blades vertically spaced apart from one another in the treatment chamber and covered by the material to be treated, rotating the distributor blades about an axis which is parallel to the direction in which the material passes through the treatment chamber, each gas distributor blade being associated with at least one suction outlet for the gas current, said outlets being situated in the side wall of said single treatment chamber above and below said distributor blades, exhausting said gas mixture by means of said suction outlets, and discharging the treated material at the bottom of said treatment chamber, whereby the material being treated is automatically passed in coherent form in the vertical direction from top to bottom through the single continuous treatment chamber and currents of gas mixture are formed in the material being treated and flow outwards in a radial direction from the gas distributor blades.

2. A biological conversion process for processing refuse or thickened sludge to form compost in a single continuous treatment chamber comprising the steps of:

filling the material to be treated from above into the top of said treatment chamber, admixing from 5 to 20% of previously treated material with the material to be treated to innoculate the material to be treated, continuously permeating the material to be treated with a gas mixture to assist the biological conversion, delivering the permeating gas mixture under elevated pressure into the material to be treated by means of a plurality of gas distributor blades vertically spaced apart from one another in the treatment chamber and covered by the material to be treated, rotating the distributor blades about an axis which is parallel to the direction in which the material passes through the treatment chamber, each gas distributor blade being associated with at least one suction outlet for the gas current, said outlets being situated in the side wall of said single treatment chamber above and below said distributor blades, exhausting said gas mixture by means of said suction outlets, said gas mixture having been heated by said biological conversion process, heating said previously treated material with said heated gas mixture, preferably by from 4°C. to 10°C., before said previously heated material is admixed, discharging the treated material at the bottom of said treatment chamber, whereby the material being treated is automatically passed in coherent form in the vertical direction from top to bottom through the single continuous treatment chamber and currents of gas mixture are formed in the material being treated and flow outwards in a radial direction from the gas distributor blades.

3. The process of claim 2 wherein from 10 to 15% of previously treated material is admixed.

4. A method according to claim 1, characterised in that the top and bottom regions of the material contained in the single treatment chamber are permeated with a smaller amount of gas mixture than the middle region.

5. An apparatus for converting refuse or thickened sludge into compost by treatment with a gas, said apparatus comprising:

a treatment chamber for receiving material to be treated, said chamber having a vertical axis, an inlet aperture, and an outlet aperture, said material passing through said chamber from top to bottom, a plurality of gas distributor blades mounted on a shaft in the treatment chamber for rotation about an axis which is parallel to the direction of material passage, said blades having gas outlet apertures connected to a pressure blower, a plurality of hollow cylindrical exhaust ducts disposed concentrically to one another, the walls of said ducts forming a part of the side wall of said treatment chamber, each of said ducts having an axial length differing from the others extending from the top towards the bottom of said treatment chamber, a plurality of annular exhaust apertures formed by the ends of said exhaust ducts, said apertures being directed towards the bottom of said treatment chamber and being spaced from one another in an axial direction, and a suction blower connected to said exhaust apertures, said pressure blower, distributor blades, exhaust apertures, exhaust ducts, and suction blower causing, through the material to be treated, a plurality of currents of treatment gas flowing radially outwards from said distributor blades towards said exhaust apertures.

6. The apparatus of claim 5 wherein said gas distributor blades are mounted at an angle, the angle being such that when rotated, the blades aid the passage of material through said chamber from top to bottom.

7. An apparatus according to claim 5 characterised in that the treatment chamber has a circular cross-section, the inlet aperture is covered by a perforated plate, and directly above the perforated plate there is disposed at least one distributor arm cooperating with the said perforated plate and mounted on the same shaft as the gas distributor blades.

8. An apparatus according to claim 5 characterised in that the treatment chamber has a circular cross-section, the outlet aperture is covered by a perforated plate, and directly above the perforated plate there is disposed at least one discharge arm cooperating with the said perforated plate and mounted on the same shaft as the gas distributor blades.

9. The apparatus of claim 5 characterised in that the ends of the exhaust ducts are bent over towards the centre axis of the chamber in order to form respective stripper edges intended for the material being treated.

* * * * *